UNITED STATES PATENT OFFICE.

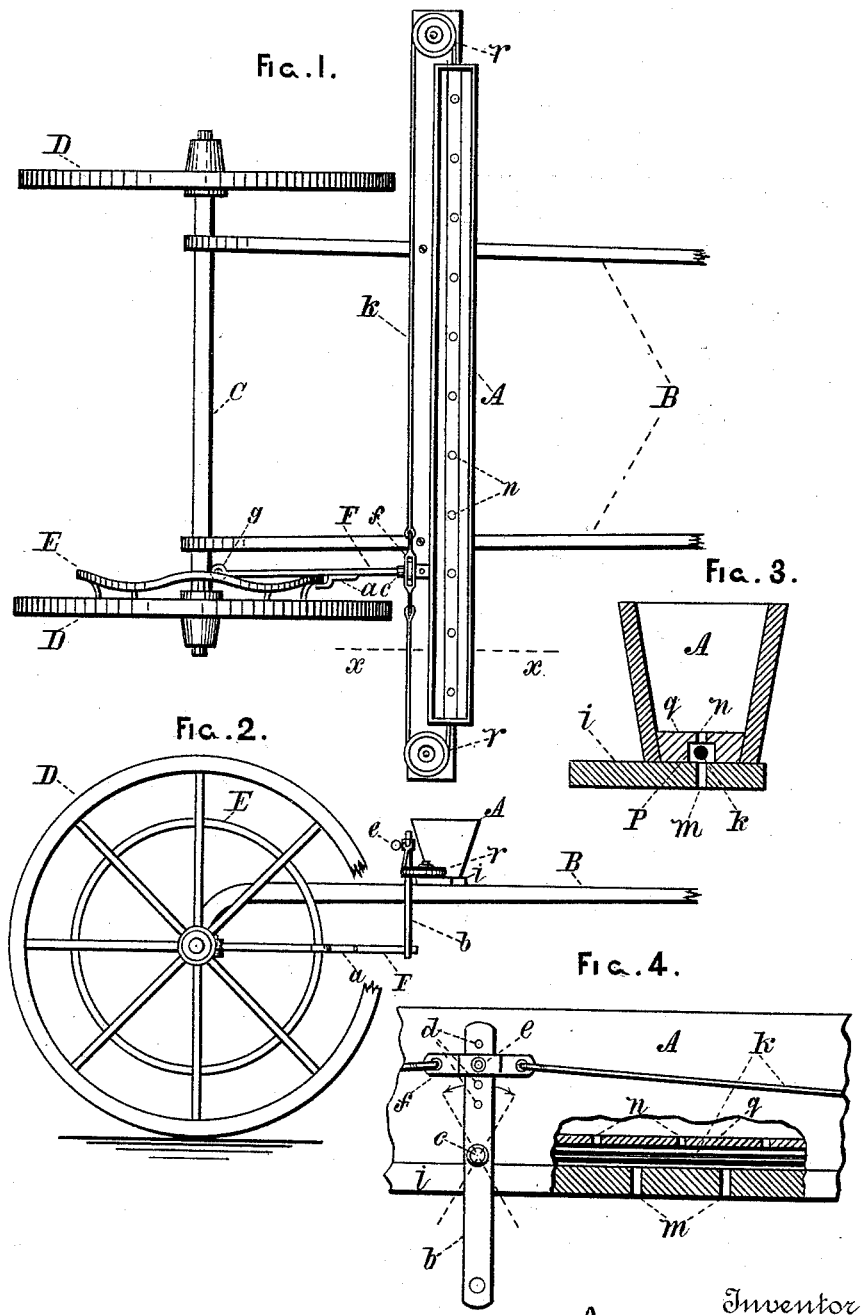

JAMES L. RHODES, OF KEMPER, ILLINOIS.

GRASS-SEEDING MACHINE.

SPECIFICATION forming part of Letters Patent No. 452,803, dated May 26, 1891.

Application filed January 12, 1891. Serial No. 377,544. (No model.)

*To all whom it may concern:*

Be it known that I, JAMES L. RHODES, of Kemper, in the county of Jersey and State of Illinois, have invented a new and Improved Grass-Seeding Machine; and I do hereby declare that the following is a full and exact description of the same, reference being had to the accompanying drawings, and to the letters of reference marked thereon.

My invention relates to an improvement in grass-seeding machines of that type in which the seed is delivered from what is essentially a long trough or hopper, the bottom of which is provided with outlet-openings, which may be closed and opened alternately by sliding mechanism actuated by hand.

My object is to provide a grass-seeding machine supported upon wheels and furnished with improved delivery mechanism actuated automatically by the rotation of one of the supporting-wheels, so that the rapidity of the delivery of the seed upon the ground shall at all times be governed by the rate at which the machine travels, thus securing a more uniform distribution of the seed than by the machines heretofore in use for the same purpose.

With this end in view my invention consists in certain details of construction and combinations of parts fully explained in the following specification, and illustrated in the accompanying drawings, in which—

Figure 1 is a plan view of my machine, and Fig. 2 is a side elevation of the same. Fig. 3 is a transverse sectional view of the seed trough or hopper, taken in the line *x x* of Fig. 1 and upon an enlarged scale. Fig. 4 is a rear elevational view of a portion of the seed-hopper, showing a part of the bottom thereof in section taken in the line of its center.

Referring to the drawings, A represents a seed receptacle or hopper supported upon shafts B, which are secured to an axle C, upon each end of which is journaled a carrying-wheel D. To the spokes of one of said wheels is secured a cam-wheel E, having a sinuous periphery, as shown in Fig. 1. Adapted to engage with the rim of the wheel E is a horizontally-reciprocating lever F, fulcrumed upon a stud G, which is secured to the axle C. To the side of the lever F is secured a yoke *a*, adapted to embrace the rim of the cam-wheel E, as shown in Fig. 1. Connected with the lever F at its forward end, as shown in Fig. 2, is a lever *b*, fulcrumed upon a stud *c*, secured to the base-board *i* of the hopper A, as shown in Figs. 1 and 2, so as to vibrate in a vertical plane, while the lever F, by which it is actuated, vibrates in a horizontal plane.

The upper end of the lever *b* is provided with a series of holes *d*, for the reception of a removable pin *e*, which pivotally secures to the lever *b* a double-ended link *f*, to which is secured the two ends of a rope *k*, which passes round sheaves *r r*, located one at each end of the base-board *i*, as shown in Fig. 1, so as to conduct the said rope into a channel *p* in the under side of the bottom *q* of the hopper or seed-trough A.

*n n*, &c., are equidistant outlets for the seed in the bottom of the hopper, and *m m*, &c., are similar equidistant outlets in the base-board, and are located so as to alternate longitudinally with the series of outlets *n*.

Matters being thus and the hopper filled with seed, the operation of the machine is as follows: The horse being hitched to the machine and the latter moving forward, the rotating cam-wheel E imparts to the lever F a reciprocating motion in a horizontal plane, which in its turn transmits a similar motion to the lever *b* in a vertical plane, the effect of which is to give to the rope *k* a longitudinal reciprocating motion in the channel *p*, and thus convey the seed from the series of holes *n* to the series *m*, the rapidity with which the seed is discharged depending on the length of stroke imparted to the rope, said length of stroke being governed by the distance at which the link *f* is pivoted from the fulcrum of the lever *b*. This latter adjustment is provided for by the series of holes *d* and removable pin *e*, so as to increase or diminish the outflow of seed.

Having fully described my invention, what I claim as new, and desire to secure by Letters Patent, is—

In a grass-seeding machine having a seed box or hopper provided with a groove in the bottom thereof, containing a rope adapted by a longitudinal reciprocating motion to uniformly drop the seed, the combination, with said seed box or hopper provided with a distributing-rope, of means for supporting the box or hopper, and mechanism for actuating the rope, comprising a pair of carrying-wheels D D and axle C, shafts B B, the latter having the seed-box secured thereon, a lever F, fulcrumed on the axle C and having at about the middle of its length a yoke adapted to include the rim of a cam-wheel, the latter secured to the spokes of one of the supporting-wheels, the forward end of said lever F being connected with the lower arm of a vertical lever $b$, fulcrumed to the base of the seed-box, the upper arm of said lever $b$ having a series of holes for the adjustment up and down of the link $f$, all of said parts constructed and adapted to each other for co-operative action, substantially in the manner and for the purpose herein set forth.

In testimony that I claim the foregoing I have hereunto set my hand this 21st day of November, A. D. 1890.

<div style="text-align:right">
his<br>
JAMES L. × RHODES.<br>
mark.
</div>

Witnesses:
  W. H. MILLER,
  L. M. CUTTING, Jr.